(12) United States Patent
Sarkisian et al.

(10) Patent No.: US 6,584,788 B1
(45) Date of Patent: Jul. 1, 2003

(54) APPARATUS AND METHOD FOR IMPROVED PERFORMANCE OF AQUA-AMMONIA ABSORPTION CYCLES

(75) Inventors: Paul Sarkisian, Boulder City, NV (US); Lance Kirol, Morrisville, VT (US); Uwe Rockenfeller, Boulder City, NV (US)

(73) Assignee: Rocky Research, Boulder City, NV (US)

( * ) Notice: Subject to any disclaimer, the term of this patent is extended or adjusted under 35 U.S.C. 154(b) by 0 days.

(21) Appl. No.: 10/125,297

(22) Filed: Apr. 16, 2002

(51) Int. Cl.[7] .................................................. F25B 15/00
(52) U.S. Cl. ........................ 62/141; 62/148; 62/238.3; 62/476
(58) Field of Search ....................... 62/141, 148, 238.3, 62/476

(56) References Cited

U.S. PATENT DOCUMENTS

| | | | | |
|---|---|---|---|---|
| RE30,252 E | * | 4/1980 | Leonard ........................ 62/84 |
| 4,411,140 A | * | 10/1983 | Katsumata et al. ......... 62/324.2 |
| 4,596,122 A | * | 6/1986 | Kantner ........................ 62/141 |
| 5,231,849 A | * | 8/1993 | Rosenblatt .................. 62/238.3 |
| 5,367,884 A | | 11/1994 | Phillips et al. ................ 62/101 |
| 5,456,086 A | * | 10/1995 | Hanna .......................... 62/101 |
| 5,490,393 A | | 2/1996 | Fuesting et al. .............. 62/101 |
| 5,548,971 A | | 8/1996 | Rockenfeller et al. ..... 62/324.2 |
| 5,586,447 A | * | 12/1996 | Sibik et al. ................... 62/141 |
| 5,601,236 A | * | 2/1997 | Wold ........................... 239/63 |
| 5,636,526 A | * | 6/1997 | Plzak et al. ................... 62/475 |
| 5,675,982 A | | 10/1997 | Kirol et al. ................... 62/225 |
| 5,966,955 A | * | 10/1999 | Maeda ....................... 62/238.3 |
| RE36,684 E | | 5/2000 | Rockenfeller et al. ..... 62/324.2 |
| 6,220,040 B1 | * | 4/2001 | Sjoblom et al. .............. 62/112 |
| 6,397,625 B1 | * | 6/2002 | Kunze ......................... 62/476 |

FOREIGN PATENT DOCUMENTS

WO    WO 01/50075 A1    7/2001

OTHER PUBLICATIONS

Modahl, R.J., et al. *"Evaluation of a Commercial Advanced Absorption Heat Pump Breadboard"*, The Trane Company, La Crosse, WI, (1988).

* cited by examiner

*Primary Examiner*—William C. Doerrler
*Assistant Examiner*—Mark Shulman
(74) *Attorney, Agent, or Firm*—Knobbe, Martens, Olson & Bear, LLP

(57) ABSTRACT

An aqua-ammonia absorption heating and/or cooling apparatus uses a thermostatic expansion valve (TXV) and a temperature-sensing bulb for controlling refrigerant flow to the evaporator having a bulb charge composition comprising a mixture of propane and butane, or an ammonia-water mixture having over 70% ammonia, by weight.

26 Claims, 3 Drawing Sheets

US 6,584,788 B1

APPARATUS AND METHOD FOR IMPROVED PERFORMANCE OF AQUA-AMMONIA ABSORPTION CYCLES

BACKGROUND OF THE INVENTION

This invention relates to aqua-ammonia absorption cooling and/or heating systems utilizing ammonia refrigerant and aqueous absorbents. Improvements in the efficiencies of such systems include the use of generator/absorber heat exchange cycles utilizing rich and weak absorption working fluids and/or by separate heat exchange loops referred to as GAX cycles. Descriptions of such systems are found in U.S. Pat. Nos. 4,311,019, 5,024,063, 5,271,235, 5,367,884, Re. 36,684 and R. J. Modahl and F. C. Hayes, "Evaluation of Commercial Advanced Absorption Heat Pump Bread Board," The Trane Company, pp. 117–125, 1988. Additional improvements are described in co-pending U.S. patent application Ser. No. 479,277, filed Jan. 5, 2000 Ser. No. 632,037, filed Aug. 3, 2000 Ser. No. 632,054, filed Aug. 3, 2000; and Ser. No. 709,875, filed Nov. 10, 2000. The description of the aforesaid patents and applications are incorporated herein by reference.

The present invention is directed to further improvement in efficiency of aqua-ammonia absorption systems by utilizing a thermostatic expansion valve (TXV) for controlling refrigerant flow into the evaporator. The use of TXVs with aqua-ammonia cycles is intended to provide correct fill of the evaporator by controlling superheat of vapor exiting the evaporator although such valves must be modified to work properly with a solution of water and ammonia refrigerant. Some aqua-ammonia equipment exhibits greater change in capacity as ambient temperature changes compared to vapor compression appliances. The relatively slow start-up of aqua-ammonia equipment results in a low-capacity operation over longer periods of time. Although conventional TXVs may provide good control of evaporator fill over a narrow range of refrigerant flow rates, it has been found that the pulsed-operation control valve described in U.S. Pat. No. 5,675,982 provides enhanced low-capacity control capability, e.g. large turn-down capability. Excellent control with large turn-down is not only beneficial for startup, but is also useful in systems with multiple or variable speed burners. TXVs are controlled by a temperature-sensing bulb located in the superheat region of the evaporator tube. The bulb is charged with a composition that produces or exerts a pressure proportional to the temperature sensed by the bulb. The bulb pressure change is directed to a movable member such as a diaphragm or bellows in the valve for opening and closing the valve in response to pressure differential between the surfaces of the diaphragm. Moreover, the performance of TXVs in refrigerant flow in aqua-ammonia absorption systems is dependent on using a bulb charge composition that functions properly with other valve design parameters.

SUMMARY OF THE INVENTION

In the system described herein a TXV cooperates with refrigerant piping for controlling the flow of refrigerant to the evaporator in an aqua-ammonia heating and/or cooling system. In one embodiment, a pulsed operation TXV is used in combination with a temperature-sensing bulb in thermal contact with the evaporator, preferably near the evaporator outlet, for controlling refrigerant flow to the evaporator, with the bulb located above the valve diaphragm.

In another embodiment of the invention, a bulb charge composition for operating a TXV for controlling superheat of vapor in an evaporator in an aqua-ammonia heating and/or cooling system comprises a mixture of water and ammonia, preferably between about 70% and 99% ammonia, and more preferably between about 80% and 90% ammonia, by weight.

In another embodiment, a bulb charge composition for operating a TXV for controlling superheat of vapor in an evaporator in an aqua-ammonia heating and/or cooling system comprises a mixture of butane and propane, preferably a major amount of propane and minor amount of butane, and more preferably between about 10% and about 40% butane and between about 90% and about 60% propane, by weight.

DETAILED DESCRIPTION OF THE PREFERRED EMBODIMENTS

An aqua-ammonia absorption apparatus incorporating a TXV cooperating with a temperature-sensing bulb for controlling refrigerant flow to the evaporator and described herein may perform cooling and/or heating functions. Aqua-ammonia absorption cooling and/or heating systems comprise an absorber assembly, a generator assembly an absorption fluid loop for directing absorption fluid between the absorber and generator assemblies, a condenser, an evaporator, and a refrigerant loop including piping for directing refrigerant from the generator assembly to the condenser and the evaporator. Such apparatus include chillers, heat pumps, refrigeration equipment, heating-only appliances, and dual-temperature appliances. The latter are a special type of heat pump that are not reversed, and in which both heating and cooling are produced simultaneously for beneficial use. Such apparatus include conventional aqua-ammonia systems as well as high-efficiency GAX apparatus disclosed in the aforesaid patents and applications and further described herein. The apparatus may also utilize variable or multiple speed burner as described in co-pending application Ser. No. 10/125,125 and incorporated herein by reference.

Aqua-ammonia solutions exhibit boiling over a range of temperatures from the bubble point to the dew point. As used herein, the term superheat is defined as the temperature above the bubble point temperature. Although such a temperature is not true super-heat, it is functionally equivalent to superheat in a single component refrigerant since most evaporation occurs at temperatures very close to the bubble point temperature. The apparatus and methods disclosed herein are for controlling refrigerant flow to the evaporator to maintain near constant or fixed superheat of refrigerant vapor leaving the evaporator.

Figure 1:
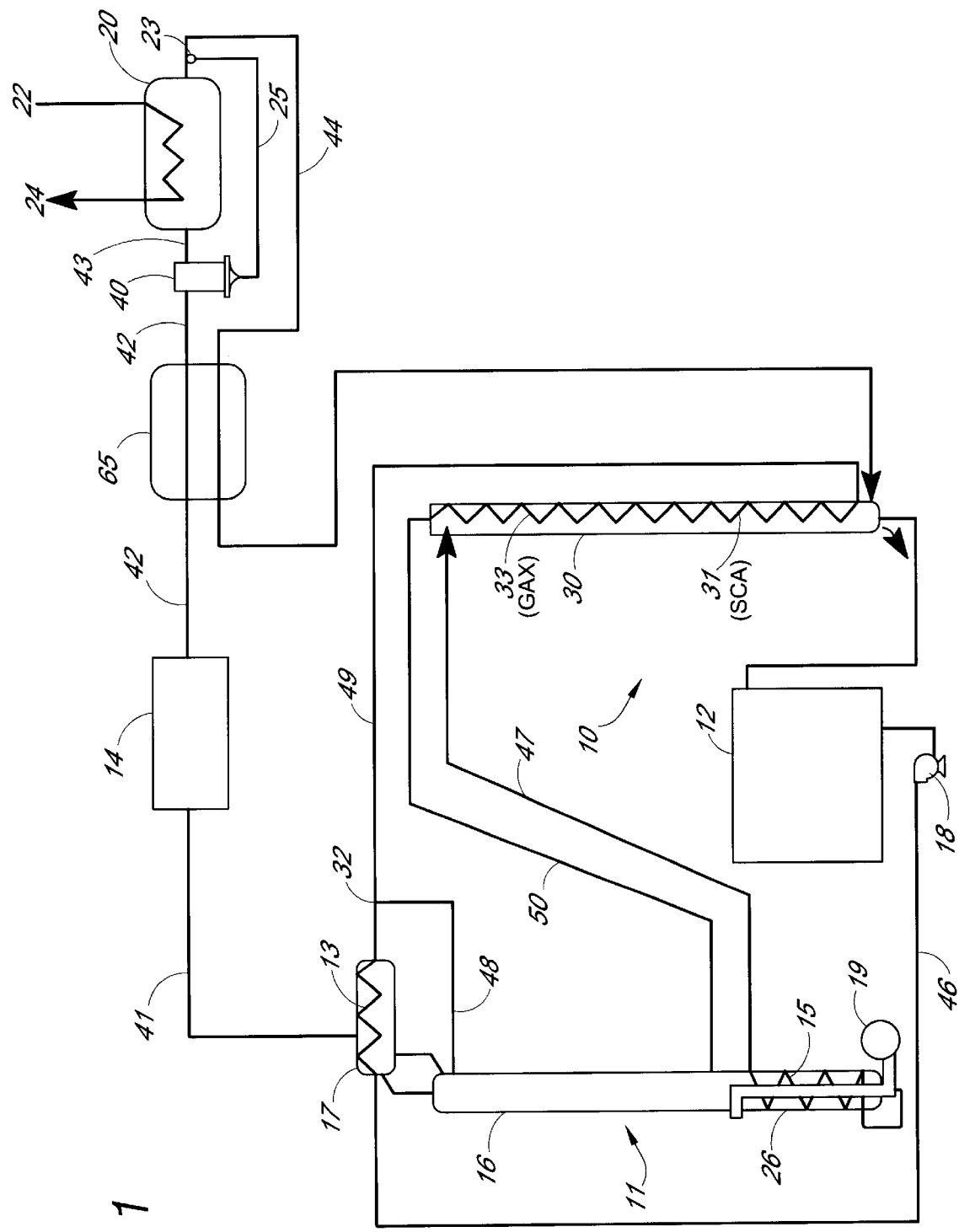
FIG. 1 is a schematic illustration of an aqua-ammonia absorption cooling system incorporating a TXV and temperature sensing bulb.

FIG. 1 schematically illustrates an aqua-ammonia generator absorber heat-exchange (GAX) chiller system. The major components of the chiller system include an absorber assembly 10 comprising an absorber 12 and an absorber heat exchange section 30 which includes an absorber heat exchanger 31, sometimes referred to as solution cooled absorber (SCA), and a GAX heat exchanger 33. The generator assembly 11 includes a generator heat exchanger 15, a boiler 26 having a burner 19 for heating and vaporizing the solution, an adiabatic section 16, and a rectifier section 17. The burner may be single speed or a multiple or variable capacity (speed) type, and may include a combustion air pre-heater. A condenser 14 and an evaporator 20 are other major components of the system. The chiller system may also include a subcooler 65 for precooling refrigerant from the condenser with cold gaseous refrigerant from the evaporator. The absorber 12 and condenser 14 heat exchangers may be air or water cooled, whereas the rectifier 17 may be cooled by solution or water. Such a GAX chiller is well-known in the art, for example, U.S. Pat. Nos. 5,490,393 and 5,367,884, and in the aforesaid Modahl et al. publication, the descriptions of which are incorporated herein by reference.

Alternatively, the absorber may be cooled by refrigerant, such as disclosed in U.S. Pat. No. Re. 36,684, and incorporated herein by reference. In such an embodiment, condensed refrigerant from the condenser is directed to the absorber heat exchanger where it is at least partially vaporized to cool the absorber. The apparatus includes refrigerant loop piping/or combining the refrigerant from the absorber heat exchanger with refrigerant vapor from a reflux coil for cooling the rectifier, the combined refrigerant being directed to the condenser where all heat is rejected. In a heat-pump type system the refrigerant loop is used with valving, more preferably a four-way valve, for reversing refrigerant flow to and from the condenser and evaporator each of which may alternatively function to evaporate or condense refrigerant. Where the system is a dual-temperature appliance, refrigerant flow is not reversed and the condenser and evaporator heat exchange functions are not reversed.

During operation of the illustrated GAX chiller absorption fluid is pumped from the absorber 12. The relatively cool refrigerant-rich absorption fluid solution is pumped by pump 18 from the absorber via pipe 46 to reflux coil 13 within rectifier 17 after which it is directed via pipe 49 to the absorber heat exchanger 31 and GAX heat exchanger 33. In the embodiment shown, a flow splitter 32 splits the ammonia-rich (rich liquor) absorption fluid passing from rectifier coil 13, a first portion to the generator via pipe 48, and a second portion to SCA 31 and GAX heat exchanger 33 and to the top of the generator heat exchanger section of the generator via pipe 50. The refrigerant vapor from evaporator 20 is directed via pipe 44 to the subcooler 65 and then to the absorber assembly 10. Weak absorption fluid, a solution having a relatively low ammonia concentration and often referred to as "weak liquor," is directed to the absorber assembly 10 from the generator via pipe 47. As weak solution from the generator passes through the absorber section containing the GAX heat exchanger 33 and the absorber heat exchanger 31, it absorbs ammonia vapor. The advantages of a GAX system with flow split of a portion of the rich absorption fluid through the GAX heat exchanger are discussed in more detail in the aforesaid references, particularly in the Modahl et al. publication and the '884 patent. However, the present invention is not limited to the use of a GAX system and may use a conventional absorber heat exchange system, although the more efficient GAX cycle is preferred.

Refrigerant vapor from generator assembly 11 is directed to condenser 14 via pipe 41, and from the condenser to the evaporator 20 via pipes 42 and 43 and valve 40. The refrigerant evaporates to cool water or other heat-transfer fluid supplied via pipe 22. The chilled water or other heat-transfer fluid is then supplied to a load for cooling a conditioned space via return pipe 24. A TXV 40 is positioned along pipe 42 for receiving condensed refrigerant from condenser 14 and for controlling the flow of refrigerant to evaporator 20. A temperature-sensing bulb 23 is positioned at or near the evaporator outlet on conduit 44, with a pressure conduit 25 communicating between the temperature-sensing bulb 23 and valve 40. The TXV incorporates a movable member or assembly for controlling the flow of refrigerant through the valve including control of the extent to which the valve inlet is open as well as opening and closing of the valve. TXVs typically incorporate a diaphragm or bellows cooperating with a plunger, rod or other component which opens or closes the valve as the diaphragm is moved in response to pressure changes from the temperature-sensing bulb. The movable member has one side exposed to the pressure of the temperature-sensing bulb via a pressure line and a second side exposed to evaporator pressure whereby the movable member operates the valve including opening and closing the valve inlet and/or outlet in response to pressure differential between the bulb and the evaporator. Examples of TXVs are disclosed in U.S. Pat. Nos. 4,959,973 and 4,750,334.

Figure 2:
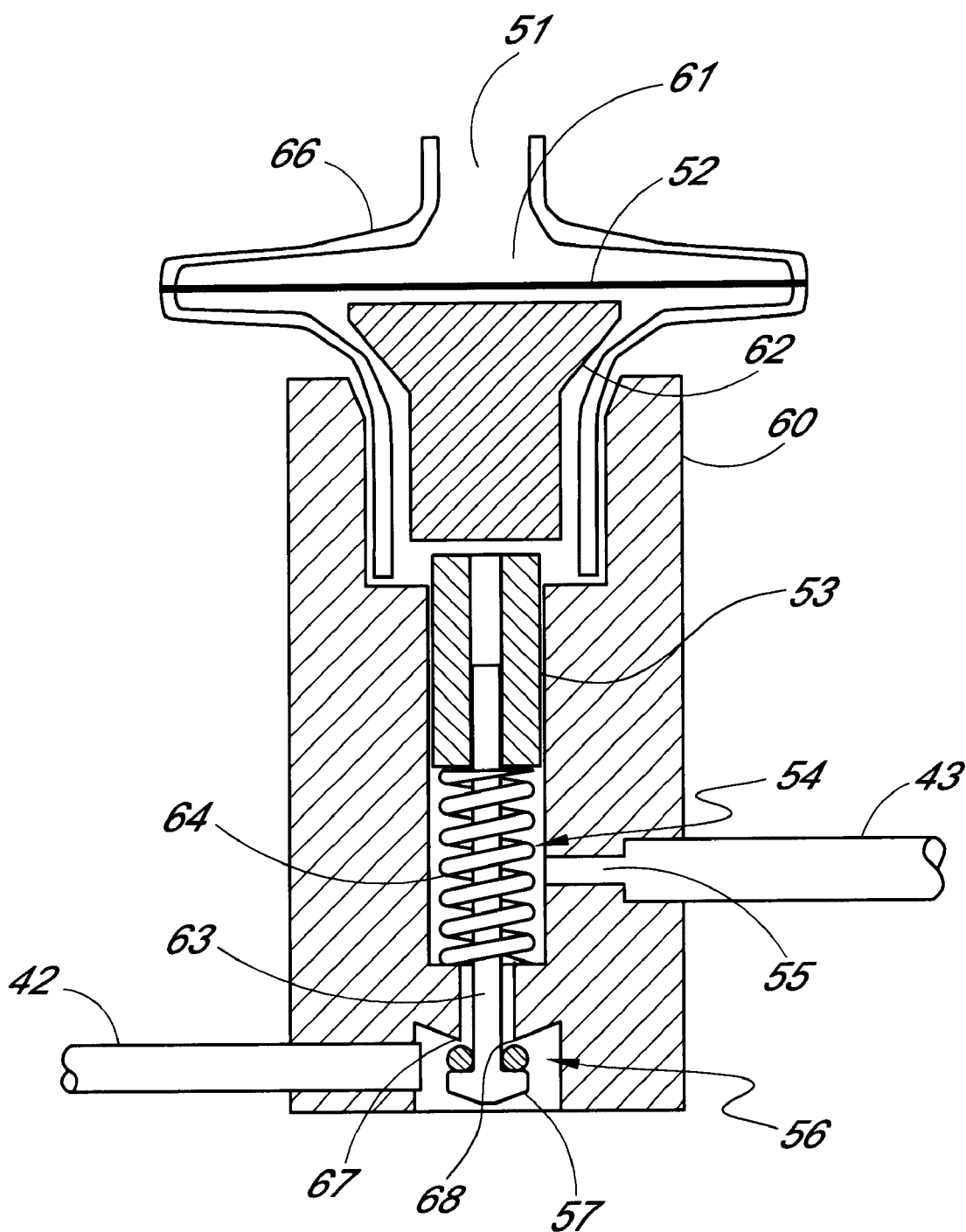
FIG. 2 is a sectional view of a preferred pulsed operation TXV used to control evaporator superheat in an aqua-ammonia absorption cooling system.

A preferred valve used in the apparatus of the invention is a pulsed operation TXV disclosed in U.S. Pat. No. 5,675,982, the description of which is incorporated herein by reference. The preferred valve shown in FIG. 2 comprises a valve body 60 having an interior cavity 64. Valve seat 67 defines valve port 68 which is opened and closed as seal 56, seated against valve plug 57, is moved upwardly and downwardly in response to the movement of diaphragm 52 against bar 62 and plunger 65 which are urged toward the diaphragm by spring 54. The assembly includes bulb connection port or pressure port 51, inlet pipe 42 and outlet pipe 43. The diaphragm is urged against the upper surface of the bar 62 by pressure from temperature-sensing bulb 23 (FIG. 1) via the bulb connection port 51. The inlet pipe 42 communicates with a condenser or liquid refrigerant reservoir, and outlet pipe 43 communicates with the evaporator of the refrigeration system. A restriction or restricted port 55 is located between the interior valve cavity 64 and the outlet pipe 43. A valve stem or rod 63 connects the piston to valve plug 57, the spring 54 urges the piston upwardly toward the diaphragm to close the inlet port. Pressure from the temperature-sensing bulb on the bulb side of the diaphragm via pressure port 51 urges the diaphragm against bar 62 and piston 53 to compress spring 54 and force seal 56 downwardly to open valve inlet port 68. Pressure in the cavity also pushes against valve plug 57 for opening inlet port 68. Forces tending to close the valve include evaporator pressure against the evaporator (bottom) side of the diaphragm 52 and the force of spring 54. Thus, when the pressure on the bulb side of the diaphragm 52 increases, or evaporator pressure decreases to the balance point, the valve opens and pressure builds under the diaphragm, i.e., within the valve, causing the valve to quickly reclose. Pressure decays as fluid bleeds through restriction 55 to the evaporator until pressure within the valve body and valve cavity 64 and on the evaporator side of the diaphragm 52 drops sufficiently to allow the valve to reopen. With the valve open, a small mass of liquid refrigerant is introduced into the valve cavity through the open inlet port, the valve then quickly recloses, the additional liquid refrigerant is not introduced until the previous "quantum" of refrigerant has bled to the evaporator. Due to the relative sizes of the inlet and outlet ports, pressure buildup in the valve cavity will occur rapidly and may result in the inlet port closing within a second or fraction thereof, or less, from the time the inlet port is opened. The pressure buildup and inlet port closing may occur more rapidly, and the valve is capable of cycle rates up to tens of times per second or even 100's of times per second. However, if desired, the cycle rate may be driven by demand, for example, as low as one cycle per hour. This valve operation may be referred to as a pulsing operation, rather than modulation, offering improved control of refrigerant to the evaporator. A preferred ratio of the area of the opening of the restriction 55:effective area of inlet orifice 68 is at least about 1:2, preferably at least 1:4, more preferably above 1:10, and most preferably between about 1:10–1:20, respectively. Thus, the preferred cross-sectional or effective inlet flow area of the valve inlet port 68 is at least 2 or more times the area of opening of the outlet port or restriction 55, and more preferably 10–20 times to ensure that pressure quickly builds under the diaphragm whereby the valve rapidly recloses. It will be understood that the effective inlet area of the inlet port is diminished by any components taking up space at or along the inlet area through which refrigerant must flow. Thus, for example, the area or space occupied by rod 63, or any other component at the inlet or outlet ports or along any critical refrigerant flow area, must be factored into the calculations of the aforesaid ratios.

The design of the pulsed-operation TXV results in refrigerant flashing into the valve cavity 64 below the diaphragm 52, with some refrigerant evaporation in the cavity as refrigerant flows from the cavity to the evaporator. Such evaporation tends to cool the diaphragm to a temperature below the temperature of the bulb, which in turn can cause migration of the bulb charge to the diaphragm cavity 61, which is the volume in the immediate vicinity of the diaphragm on the bulb side of the diaphragm and enclosed by the diaphragm cover 66. When charge migration to the diaphragm cavity occurs, sufficient bulb charge to fill the diaphragm cavity, with some liquid remaining in the bulb, is required for proper operation of the apparatus. Liquid in the diaphragm cavity will then be subcooled, and liquid in the bulb is at saturation pressure and pressurizes the entire bulb circuit as required for proper operation. Where the diaphragm cavity is positioned higher than the bulb, liquid condensing in the diaphragm cavity can flow back to the bulb, setting up a thermosyphon conducting heat to the diaphragm cavity from the bulb. When such a thermosyphon effect is ongoing, the pressure in the bulb circuit is intermediate between the bulb charge vapor pressure dictated by bulb temperature and vapor pressure dictated by diaphragm temperature, and the TXV does not respond to bulb temperature as desired. Such problems with bulb charge migration may be aggravated when a multiple component bulb charge is used, such as propane/butane mixtures described herein, because separation caused by distillation can occur during bulb charge migration, and the bulb charge composition in the bulb may change from the average composition of the charge. Such problems may be alleviated or avoided by placing the bulb above the TXV diaphragm. With the bulb above the valve diaphragm as illustrated in FIG. 1, at all times when the diaphragm is as cold as or colder than the bulb, the diaphragm cavity will remain full of subcooled liquid and pressure will be dictated by vapor pressure of liquid in the bulb, thereby avoiding thermosyphoning and distillation.

The preferred bulb charges used for refrigerant flow control to the evaporator achieve a nearly full evaporator, but without flooding of the evaporator. To achieve this, preferred bulb charges exhibit vapor pressure curves having slope less than the slope of the vapor pressure curve of the system refrigerant, over the range of evaporator in operating temperature. Such behavior causes superheat to remain relatively constant during operation. Two of such preferred bulb charges are an ammonia-water mixture and a propane-butane mixture. The ammonia-water composition has above 70% ammonia, up to 99%, preferably above 75%, and more preferably between about 80% and about 90%, ammonia, by weight. The propane-butane mixture is preferably between about 60% and about 90% propane and about 10% and about 40% butane, by weight. Preferably, the amount of propane is between about 70% and about 90%, by weight. Other bulb charges that perform satisfactorily for controlling the aqua-ammonia absorption chiller or mild temperature heat pump applications are fluorocarbon compositions R409a, R409b, R414b, R500 and R115.

Figure 3:
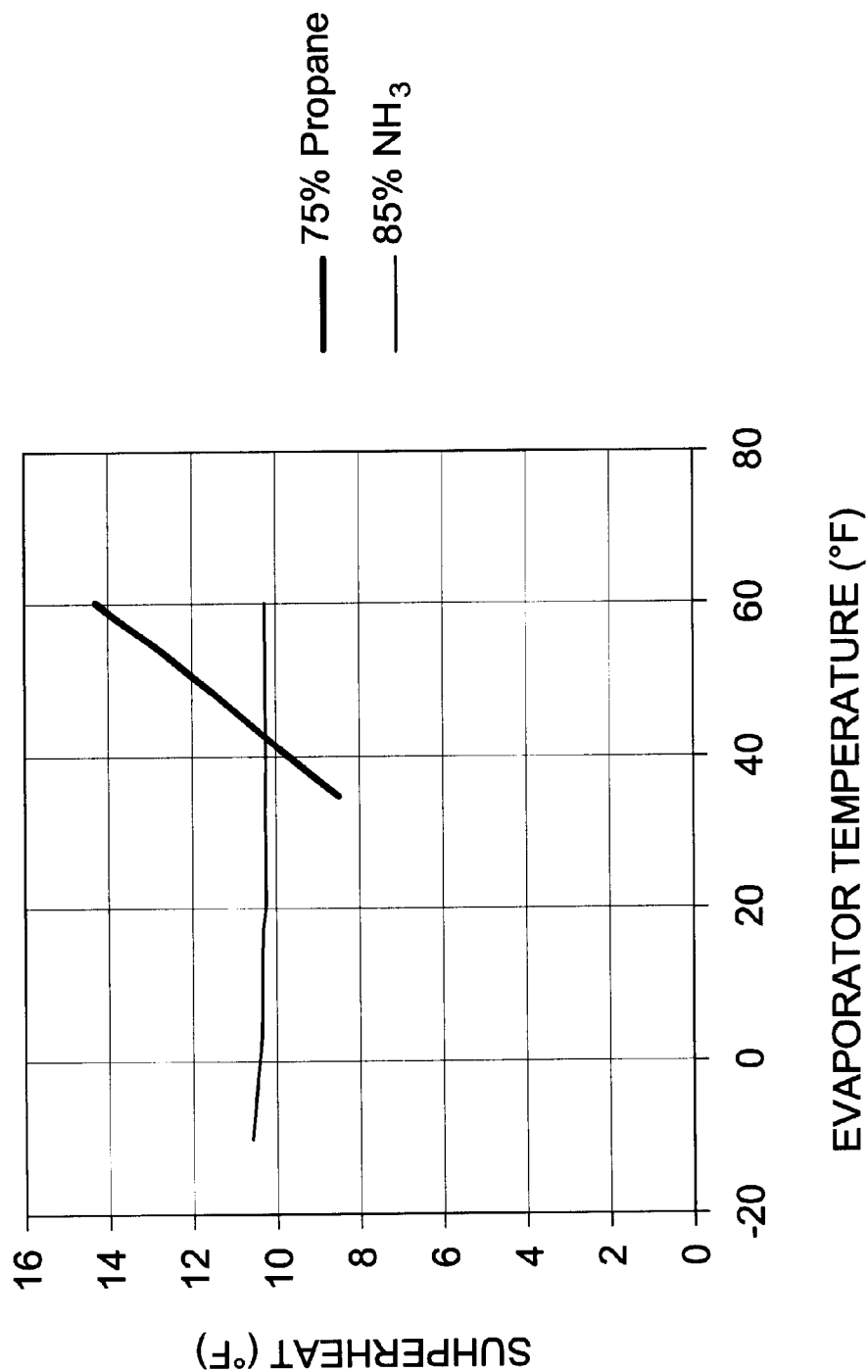
FIG. 3 is a graph illustrating evaporator superheat control using a TXV and bulb charges of the invention.

FIG. 3 shows superheat control over a range of evaporator temperatures for two preferred bulb charges. Vapor pressure of the bulb charge should be less than, but relatively close to, the vapor pressure of ammonia, thereby avoiding the necessity of excessively high spring forces in the valve. One charge for which response is plotted is 85% ammonia and 15% water. This charge is capable of maintaining superheat nearly constant for evaporator temperatures from below 0° F. to above 60° F., and is thus suitable for use in a heat pump chiller or refrigeration system operating over a wide range of ambient temperatures. In the example shown, superheat is controlled around 10° F. but this can be adjusted by changing spring pressure. Other water ammonia mixtures will also work as bulb charges. More ammonia in the mixture requires higher spring forces for equivalent superheat. Reasonable mixtures are in the range of 80% ammonia to over 90%. Lower concentrations of ammonia result in superheat in excess of 25° F., and generally not appropriate for aqua-ammonia absorption applications.

FIG. 3 also shows superheat response for a bulb charge comprising 75% propane and 25% butane. The response with this charge is less flat than that of water ammonia at 85% ammonia, but between 40° F. and 60° F. evaporator temperature, superheat only changes from about 9° F. to 14° F. Thus, the propane-butane charge works well for aqua-ammonia absorption chillers where evaporator temperature does not go below about 40° F. and heat pumps where ambient temperatures are above freezing, e.g. about 40° F.

Increased superheat at elevated evaporator temperature can be beneficial in that the tendency for evaporator flooding on start-up is reduced, and superheat increases at conditions where cooling capacity is greater.

Curves of FIG. 3 are generated for a TXV having the following design parameters: 5 pounds spring force, 2.3-inch diaphragm diameter, 0.125-inch inlet orifice diameter, condenser pressure operating against the valve plug in a direction so as to close the valve and condenser temperature of 117° F. with 99.5% ammonia refrigerant.

It will be understood by those skilled in the art that parameters including bulb charge composition, valve inlet orifice diameter, diaphragm diameter and spring force must be properly matched to yield satisfactory valve response. Conventional TXVs move the valve stem further open to allow increased flow through the valve. As the stem moves the valve plug further from the valve seat, the spring is compressed further, the spring force acting against stem movement increases, and the response curve of the valve changes. However, aqua-ammonia absorption chillers, heat pumps and heating-only appliances are capable of capacity modulation over a wide range and require better turn-down performance than is available with conventional TXVs. A pulsed operation TXV, as described in U.S. Pat. No. 5,675, 982, controls to nearly constant superheat at all levels of refrigerant flow, including flow rates below design flow, down to nearly zero flow. Such a valve meets the needs of aqua-ammonia absorption cycles of the present invention.

The above described embodiments may be used in a system incorporating a single speed burner or a variable or multiple speed burner. The latter may use a continuously variable speed (firing) burner or one having two or more discrete burner speeds. A higher speed (firing rate) is used when building load temperatures require increased system output, and a lower burner speed for milder heating and/or cooling loads. Such burners and systems are further described in aforesaid application Ser. No. 10/125,125.

What is claimed is:

1. An aqua-ammonia absorption cooling and/or heating apparatus comprising:
   an absorber assembly, a generator assembly and an absorption fluid loop for directing absorption fluid between said absorber and generator assemblies, a condenser, an evaporator and a refrigerant loop including piping for directing refrigerant from the generator assembly to the condenser and from the condenser to the evaporator, and a valve assembly cooperating with said refrigerant piping for controlling the flow of refrigerant therein, said valve assembly comprising a first valve having an inlet port communicating with said condenser, an outlet port communicating with said evaporator, and a temperature-sensing bulb in thermal contact with said evaporator at or near the evaporator outlet, said first valve including a pressure port exposed to the temperature-sensing bulb pressure and a movable member exposed to said pressure port and responsive to bulb pressure for operating said first valve and for controlling flow therethrough in response to temperature sensed by the temperature-sensing bulb, said temperature-sensing bulb containing a bulb charge composition comprising an ammonia-water mixture having above 70% ammonia, by weight.

2. An apparatus of claim 1 wherein said bulb charge comprises between about 80% and about 90% ammonia.

3. An apparatus of claim 1 wherein said movable member has a first side exposed to temperature-sensing bulb pressure and a second side exposed to evaporator pressure, whereby said movable member causes said first valve to operate in response to the pressure differential between the temperature-sensing bulb and the evaporator.

4. An apparatus of claim 1 wherein said condenser and evaporator comprise first and second heat exchangers, respectively, each capable of functioning as a condenser or an evaporator, said apparatus having one or more second valves cooperating with said refrigerant loop for selectively reversing the flow of refrigerant to and from the said heat exchangers.

5. An apparatus of claim 4 wherein said absorber includes a heat exchanger coil in fluid communication with said refrigerant loop whereby condensed refrigerant is directed to said heat exchanger coil and is at least partially vaporized therein to cool said absorber, and wherein said refrigerant loop includes piping for directing vaporized refrigerant from said absorber heat exchanger coil and from said generator assembly to said condenser.

6. An apparatus of claim 1, 3, 4 or 5 wherein said absorber assembly includes an absorber, an absorber heat exchanger and a generator/absorber heat exchanger, and said absorption fluid loop includes one or more conduits for directing ammonia-rich absorption fluid from the absorber to the absorber heat exchanger and the generator/absorber heat exchanger.

7. An apparatus of claim 6 wherein said generator assembly includes a variable speed or multiple speed burner having a continuously variable firing rate or a plurality of firing rates.

8. An apparatus of claim 3 wherein said valve assembly comprises a pulsed operation control valve comprising:
   an inlet port in communication with said condenser having an inlet flow area for receiving condensed refrigerant, and a valve for opening and closing said inlet port;
   an outlet port having an outlet flow area and communicating with said evaporator for directing liquid refrigerant thereto;
   a valve cavity between said inlet port and said outlet port and in open communication therewith;
   said valve being responsive to pressure within said valve cavity for operating the valve and controlling the opening and closing of said inlet port, and wherein higher pressure therein biases said valve to close said inlet port and lower pressure therein biases valve to open said inlet port; and
   said inlet flow area being at least twice the size of said outlet flow area whereby opening said inlet port provides for rapid pressure buildup in said cavity and rapid closure thereof after each opening.

9. An apparatus of claim 8 wherein said generator assembly includes a variable speed burner having a continuously variable firing rate or a plurality of firing rates.

10. An apparatus of claim 6 wherein said valve assembly comprises a pulsed operation control valve comprising:
    an inlet port in communication with said condenser having an inlet flow area for receiving condensed refrigerant, and a valve for opening and closing said inlet port;
    an open outlet port having an outlet flow area and communicating with said evaporator for directing liquid refrigerant thereto;
    a valve cavity between said inlet port and said outlet port and in open communication therewith;
    said valve being responsive to pressure within said valve cavity for operating the valve and controlling the opening and closing of said inlet port, and wherein higher pressure therein biases said valve to close said inlet port and lower pressure therein biases valve to open said inlet port; and
    said inlet flow area being at least twice the size of said outlet flow area whereby opening said inlet port provides for rapid pressure buildup in said cavity and rapid closure thereof after each opening.

11. An aqua-ammonia absorption cooling and/or heating apparatus comprising:
    an absorber assembly, a generator assembly and an absorption fluid loop for directing absorption fluid between said absorber and generator assemblies, a condenser, an evaporator and a refrigerant loop including piping for directing refrigerant from the generator assembly to the condenser and from the condenser to the evaporator, and a valve assembly cooperating with said refrigerant piping for controlling the flow of refrigerant therein, said valve assembly comprising a pulsed operation control valve having an inlet port in communication with said condenser having an inlet flow area for receiving condensed refrigerant, and a valve for opening and closing said inlet port, an outlet port having an outlet flow area and communicating with said evaporator, a valve cavity between said inlet port and said outlet port and in open communication therewith, said valve being responsive to pressure within said valve cavity wherein higher pressure therein biases said valve to close said inlet port and lower pressure therein biases said valve to open said inlet port, said inlet flow area being at least twice the size of said outlet flow area whereby opening said inlet port provides for rapid pressure buildup in said cavity and rapid closure thereof after each opening, and a temperature-sensing bulb in thermal contact with said evaporator at or near the evaporator outlet wherein said valve assembly includes a pressure port exposed to the temperature-sensing bulb pressure, and a movable member exposed to said pressure port and responsive to bulb pressure for operating said valve and for controlling flow therethrough in response to temperature sensed by the temperature-sensing bulb, said movable member having a first side exposed to temperature-sensing bulb pressure and a second side exposed to evaporator pressure, whereby said movable member causes the valve to operate in response to the pressure differential between the temperature-sensing bulb and the evaporator, and wherein said temperature-sensing bulb is located above said movable member.

12. An apparatus of claim 11 wherein said condenser and evaporator comprise first and second heat exchangers, respectively, each capable of functioning as a condenser or an evaporator, said apparatus having one or more second valves cooperating with said refrigerant loop for selectively reversing the flow of refrigerant to and from the said heat exchangers.

13. An apparatus of claim 12 wherein said absorber includes a heat exchanger coil in fluid communication with said refrigerant loop whereby condensed refrigerant is directed to said heat exchanger coil and is at least partially vaporized therein to cool said absorber, and wherein said refrigerant loop includes piping for directing vaporized refrigerant from said absorber heat exchanger coil and from said generator assembly to said condenser.

14. An apparatus of claim 11, 12 or 13 wherein said absorber assembly includes an absorber, an absorber heat exchanger and a generator/absorber heat exchanger, and said absorption fluid loop includes one or more conduits for directing ammonia-rich absorption fluid from the absorber to the absorber heat exchanger and the generator/absorber heat exchanger.

15. An apparatus of claim 14 wherein said generator assembly includes a variable speed burner having a continuously variable firing rate or a plurality of firing rates.

16. An aqua-ammonia absorption chiller apparatus comprising:

an absorber assembly, a generator assembly and an absorption fluid loop for directing absorption fluid between said absorber and generator assemblies, a condenser, an evaporator and a refrigerant loop including piping for directing refrigerant from the generator assembly to the condenser and from the condenser to the evaporator, and a valve assembly cooperating with said refrigerant piping for controlling the flow of refrigerant therein, said valve assembly comprising a first valve having an inlet port communicating with said condenser, an outlet port communicating with said evaporator, and a temperature-sensing bulb in thermal contact with said evaporator at or near the evaporator outlet, said first valve including a pressure port exposed to the temperature-sensing bulb pressure and a movable member exposed to said pressure port and responsive to bulb pressure for operating said valve and for controlling flow therethrough in response to temperature sensed by the temperature-sensing bulb, said temperature-sensing bulb containing a bulb charge composition comprising between about 10% and about 40% butane and between about 90% and about 60% propane, by weight.

17. An apparatus of claim 16 wherein said movable member has a first side exposed to temperature-sensing bulb pressure and a second side exposed to evaporator pressure, whereby said movable member causes said first valve to operate in response to the pressure differential between the temperature-sensing bulb and the evaporator.

18. An apparatus of claim 16 wherein said condenser and evaporator comprise first and second heat exchangers, respectively, each capable of functioning as a condenser or an evaporator, said apparatus having one or more second valves cooperating with said refrigerant loop for selectively reversing the flow of refrigerant to and from the said heat exchangers.

19. An apparatus of claim 18 wherein said absorber includes a heat exchanger coil in fluid communication with said refrigerant loop whereby condensed refrigerant is directed to said heat exchanger coil and is at least partially vaporized therein to cool said absorber, and wherein said refrigerant loop includes piping for directing vaporized refrigerant from said absorber heat exchanger coil and from said generator assembly to said condenser.

20. An apparatus of claim 16, 17, 18 or 19 wherein said absorber assembly includes an absorber, an absorber heat exchanger and a generator/absorber heat exchanger, and said absorption fluid loop includes one or more conduits for directing ammonia-rich absorption fluid from the absorber to the absorber heat exchanger and the generator/absorber heat exchanger.

21. An apparatus of claim 20 wherein said generator assembly includes a variable speed or multiple speed burner having a continuously variable firing rate or a plurality of firing rates.

22. An apparatus of claim 17 wherein said valve assembly comprises a pulsed operation control valve comprising:

an inlet port in communication with said condenser having an inlet flow area for receiving condensed refrigerant, and a valve for opening and closing said inlet port;

an outlet port having an outlet flow area and communicating with said evaporator for directing liquid refrigerant thereto;

a valve cavity between said inlet port and said outlet port and in open communication therewith;

said valve being responsive to pressure within said valve cavity for operating the valve and controlling the opening and closing of said inlet port, and wherein higher pressure therein biases said valve to close said inlet port and lower pressure therein biases valve to open said inlet port; and said inlet flow area being at least twice the size of said outlet flow area whereby opening said inlet port provides for rapid pressure buildup in said cavity and rapid closure thereof after each opening.

23. An apparatus of claim 16 wherein said temperature-sensing bulb is located above said moveable member.

24. In operating an aqua-ammonia absorption heating and/or cooling system utilizing a valve assembly for controlling the flow of ammonia to an evaporator and a temperature sensing bulb in thermal contact with the evaporator at or near the evaporator outlet, the bulb having a bulb charge composition which exerts a pressure for opening and/or closing the valve in response to temperature sensed by the bulb, a method of improving evaporator performance and system efficiency comprising utilizing an ammonia-water bulb charge composition comprising above 70% ammonia, by weight.

25. A method of claim 24 comprising utilizing an ammonia-water bulb charge having between about 80% and about 90% ammonia, by weight.

26. In operating an aqua-ammonia absorption heating and/or cooling system utilizing a valve assembly for controlling the flow of ammonia to an evaporator and a temperature sensing bulb in thermal contact with the evaporator at or near the evaporator outlet, the bulb having a bulb charge composition which exerts a pressure for opening and/or closing the valve in response to temperature sensed by the bulb, a method of improving evaporator performance and system efficiency comprising utilizing a bulb charge composition comprising a propane/butane composition having between about 60% and about 90% propane, by weight.

* * * * *